United States Patent [19]

Benjamin

[11] 4,254,973
[45] Mar. 10, 1981

[54] FLUID COUPLING SEAL

[75] Inventor: Braham Benjamin, Santa Ana, Calif.

[73] Assignee: Celanese Corporation, New York, N.Y.

[21] Appl. No.: 34,960

[22] Filed: Apr. 30, 1979

[51] Int. Cl.³ .............................................. F16L 37/00
[52] U.S. Cl. .................................. 285/312; 285/328; 285/379
[58] Field of Search .............. 285/379, 328, 312, 349, 285/110, 374, 231; 277/208, 189, 207 A

[56] References Cited

U.S. PATENT DOCUMENTS

| 101,488 | 4/1870 | Mendham | 285/349 X |
|---|---|---|---|
| 882,690 | 3/1908 | Jones | 285/312 X |
| 2,408,243 | 9/1946 | Vartanian | 285/349 X |
| 2,478,586 | 8/1949 | Krapp | 285/312 |

FOREIGN PATENT DOCUMENTS

| 712047 | 6/1965 | Canada | 285/177 |
|---|---|---|---|
| 697347 | 10/1930 | France | 285/328 |

Primary Examiner—Dave W. Arola
Attorney, Agent, or Firm—George A. Maxwell

[57] ABSTRACT

A fluid coupling including an elongate female section with front and rear ends, a central flow passage, means to connect the front end with a fluid conductor and a central cylindrical socket entering its rear end and defining a flat bottom; an annular sealing ring positioned in the socket adjacent said bottom; an elongate male section with front and rear ends, a central flow passge and means at its rear end to connect with a fluid conductor; the male section is slidably engaged with the socket in the female section with its front end engaging said seal; a mechanical means is provided to hold the male section forwardly in and relative to the female section with said ring clamped tight between said bottom and front end of the male section; the coupling includes means to retain the ring in the socket and including a plurality of circumferentially spaced longitudinally extending, radially inwardly projecting ring engaging ribs in the socket and about which adjacent portions of the ring flow to establish conformed tight retaining contact therewith.

6 Claims, 7 Drawing Figures

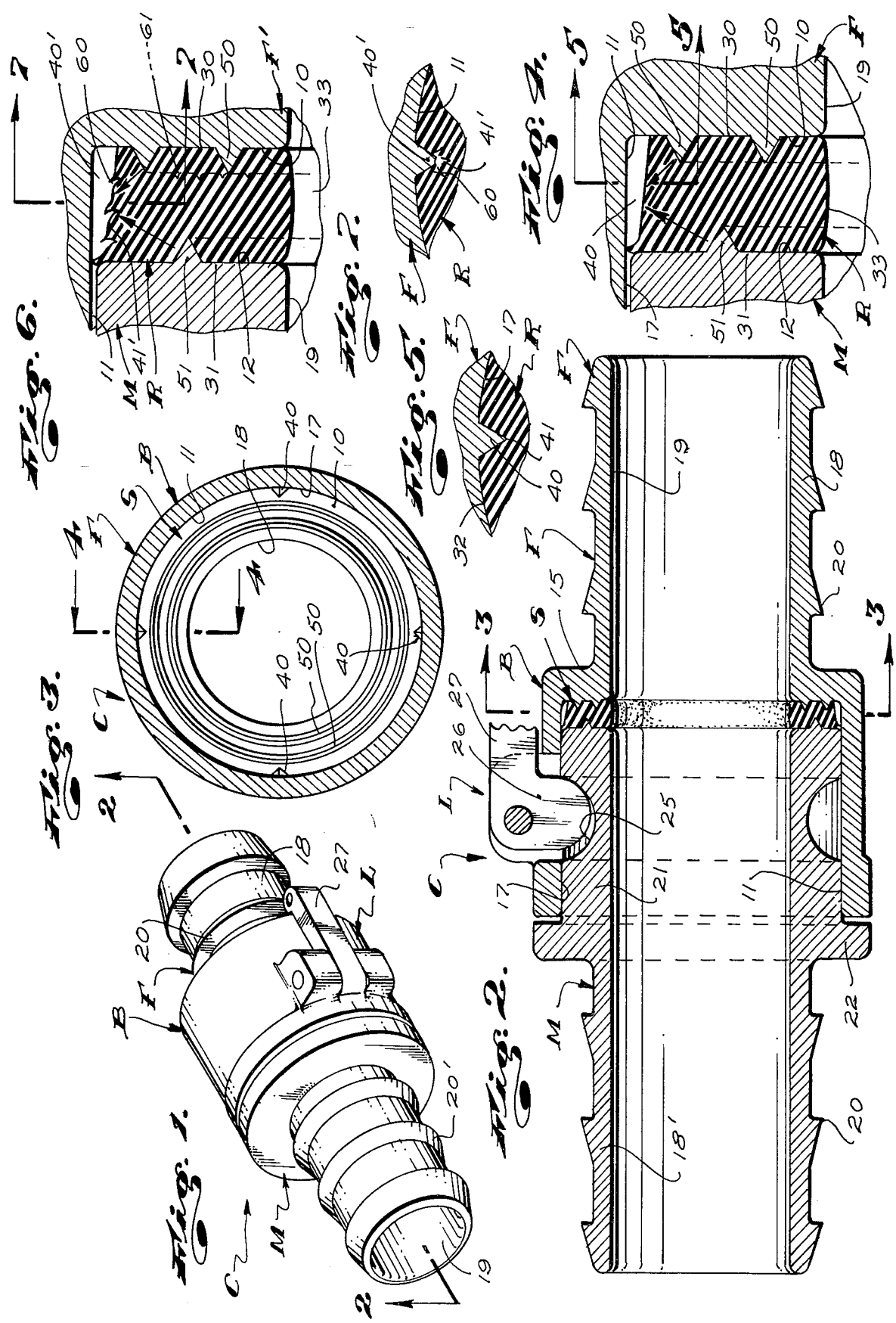

FLUID COUPLING SEAL

This invention has to do with a fluid coupling and is particularly concerned with a fluid coupling having a novel butt seal structure.

BACKGROUND OF THE INVENTION

In the art of fluid handling couplings which include releasably engageable male and female sections with central axially aligned fluid passages and axially spaced opposing annular sealing faces and/or seats between which annular rubber or rubber-like sealing rings are tightly engaged; the opposing sealing seats and/or faces are commonly defined by axially inwardly or forwardly disposed terminal ends on the male sections and by axially outwardly disposed, radially extending bottoms of sockets entering the rear ends of the female sections and in which the male sections are normally engaged.

A major problem found in couplings of the general character referred to above resides in the tendency for the annular sealing rings, which normally occur at the bottoms of the sockets in female sections, to move out of position and become displaced when the coupling sections are disengaged. More particularly, during and following disengagement of the coupling sections, fluids flowing in and through the coupling sections tend to wash the sealing rings from desired operating position in the sockets of the female sections.

To overcome the above noted problem, it has become common practice in the art of fluid couplings, of the character referred to, to provide radially inwardly opening annular sealing ring retaining grooves in the inner ends of the sockets in the female sections and to increase the outside diametric extent of the sealing rings so that the outer peripheral portions of the rings engage in the grooves, whereby the rings are effectively retained in the sockets in proper operating relationship therewith.

While provision of the above noted sealing ring retaining grooves in the sockets of the female sections of couplings is very effective, establishment of such grooves, which must be cut in the sockets of the female sections by separate and special machining operations is inconvenient, time consuming and results in a material increase in the cost of the resulting couplings.

In practice, the male and female sections of couplings of the character referred to above are preferably mass produced of metal or of plastic resin by die-casting or injection molding techniques. When so producing those coupling sections, the only machining operations which must be performed is the establishment of the sealing ring retaining grooves in the sockets of the female sections. These machine operations, in addition to slowing and limiting production, greatly increase the cost of manufacturing the otherwise inexpensive to produce coupling sections.

As a result of the foregoing, the want, need and/or desirability of the butt seal structure for fluid couplings of the character referred to above, which does not require the machining of special sealing retaining grooves or the like, has long been recognized.

OBJECTS AND FEATURES OF THE INVENTION

It is an object of this invention to provide a fluid coupling including an elongate female section with front and rear ends, a central longitudinal flow passage, a cylindrical socket with a flat axially rearwardly disposed annular bottom or seal seat entering its rear end; an elongate cylindrical male section with front and rear ends, a central longitudinal flow passage and a flat axially forwardly disposed annular sealing face at its front end and engageable in the socket in the female section; and, an annular resilient sealing ring engaged in the socket in seated engagement with said seat and engageable by or with said face.

Another object and feature of this invention is to provide a coupling of the general character referred to above which includes sealing ring retaining means including projections formed integrally with the female section in the socket thereof to normally engage the sealing ring to releasably retain said ring in position within the socket.

Yet another object and feature of the present invention is to provide a coupling of the character referred to above wherein said sealing ring retaining projections are elongate, longitudinally extending, radially inwardly projecting ribs formed integrally on and with the cylindrical surface or bore of the socket in the female section adjacent the seat defined by said socket and engaged in and with the outer peripheral portion of the sealing ring arranged within the socket and adjacent said seat.

Still another object and feature of this invention is to provide a coupling of the general character referred to above wherein the elongate sealing ring retaining projections have radially inwardly disposed longitudinally extending inner seal engaging edges with irregularities formed thereon to define radially inwardly opening and/or projections to receive and/or engage material of the sealing rings whereby the ring is mechanically locked with the projections.

An object and feature of the present invention is to provide a sealing ring engaging and supporting bead like projections on the opposing seal seat and sealing face to prevent radial inward displacement of the sealing ring, between said seat and face, and to cause the outer portion of the sealing ring to flow radially outwardly into intimate engagement with the sealing ring retaining projections in the socket when the ring is clamped tight between said seat and face.

Another object and feature of the invention is to provide a coupling structure of the character referred to above wherein said sealing ring supporting projections include one or a plurality of radially spaced axially inwardly projecting annular sealing ring engaging beads on one seat and one or a plurality of radially spaced axially forwardly projecting annular sealing ring engaging beads on said sealing face and radially offset from the bead or beads on said seat whereby the beads establish effective holding engagement in and with the sealing ring without pinching and concentrating potentially damaging forces onto and through the ring.

The foregoing and other objects and features of this invention will be apparent and will be fully understood from the following detailed description of preferred forms and embodiments of the invention, throughout which description reference is made to the accompanying drawings.

DESCRIPTION OF THE DRAWINGS

FIG. 1 is an isometric view of a coupling embodying the invention;

FIG. 2 is an enlarged detailed sectional view taken substantially as indicated by line 2—2 on FIG. 1;

FIG. 3 is a cross-sectional view taken substantially as indicated by line 3—3 on FIG. 2;

FIG. 4 is an enlarged detailed sectional view of a portion of the structure shown in FIG. 2.

FIG. 5 is a view taken substantially as indicated by line 5—5 on FIG. 4;

FIG. 6 is a view similar to FIG. 4 showing a modified form of the invention; and FIG. 7 is a sectional view taken substantially as indicated by line 7—7 on FIG. 6.

DETAILED DESCRIPTION OF THE INVENTION

The present invention resides in a novel seal structure S to seal with and between a flat radially extending axially disposed annular seal seat 10 at the bottom of a socket or bore 11 in a female section F of a fluid coupling C; and, a flat radially extending axially disposed annular sealing face 12 on the inner end of a male section M of the coupling C, spaced axially from and opposing said seat 10. The seal structure S next includes an annular, radially extending, flexible resilient sealing ring R formed of rubber or the like arranged within the socket 11 in the female section F and normally held in tight clamped and sealing engagement with and between the seat 10 at the bottom of the socket in the female section, the face 12 at the end of the male section M; and, with the bore of the socket.

The coupling C and each of its sections F and M can vary widely in design and details of construction. It is sufficient and is only necessary that the female section F has or defines the aforementioned socket 11 and seat 10 and that the male section M has a portion engageable in the socket and which defines the aforementioned face 12.

For the purpose of illustration, in FIGS. 1 and 2 of the drawings, the coupling C is a quick disconnect fluid coupling structure in which the female section F includes an enlarged cylindrical body B with front and rear ends 15 and 16 and an elongate rearwardly opening socket 11 with a straight cylindrical bore 17 entering its rear end and terminating therein to define the annular seal seat 10, which is disposed axially rearwardly.

The section F further includes an elongate cylindrical neck 18 concentric with and projecting axially forwardly from the forward end 15 of the body B. The neck 18 has a central longitudinal flow passage 19 extending into the body to open at and centrally of said seat 10 and communicating with the socket.

The exterior of the neck 18 is provided with a plurality of longitudinally space annular ribs 20.

The neck 18 is adapted to be slid and forcibly engaged in the end of a related resilient fluid conducting hose or the like (not shown) and the ribs 20 serve to maintain the bore and the neck engaged with each other.

The male section M of the coupling C is shown as including an elongate cylindrical body B' with front and rear ends. The outside diameter of the body B' is such that the body can be freely slidably engaged in the socket 11 of the female section F, from the open rear end thereof. The section M next includes a radially outwardly projecting stop flange 22 at the rear end of the body B' and an elongate neck 18' projecting axially rearwardly from the body and/or flange. The neck 18' is similar to the neck 18 on the female section F; is adapted to engage a hose (not shown) and has ribs 21' to retain the hose and neck 18' coupled.

In addition the foregoing, the coupling C is provided with one or more releasable latches L to releasably retain the sections F and M coupled. The latches L include an annular radially outwardly opening groove 25 in the body B' of the male section M and a groove engaging cam member 26 pivotally carried by the body B of the female section. The cam 26 has an operating lever 27 accessible at the exterior of the body B.

When the male section is engaged in the female section, by manually pivoting the lever arm 27, the cam 26 of the latch means L can be shifted, radially inwardly and axially forwardly or radially outwardly and axially rearwardly, into and out of engagement in the groove 25 in the male section M. The cam and the groove therefor are so formed and related so that when the cam is moved radially inwardly and forwardly into engagement in the groove in the male section, it merges and moves and urges the male section axially forwardly into the socket and into tight clamping engagement with the sealing ring R. The cam is such that when it is fully actuated into engagement in the groove in the male section M, it moves over center relative to its pivotal axis and effectively releasably holds the male section M forward in the socket with the ring R clamped tight between its related seat and face.

While but one latch L is shown, it will be apparent that the number of latches can be increased as desired or as circumstances require.

It is to be noted that the sections F and M of coupling structure C shown in the drawings and described above are simple to make parts which are free of internal grooves and the like whereby each is particularly suitable to be mass-produced by molding or die-casting techniques. It will be further apparent that the molded or die-cast sections are such that they are finished when molded or cast and do not require any subsequent costly or time-consuming secondary machining or finishing operations to be performed thereon.

Referring again to the seal structure S, the resilient ring R is characterized by flat radially extending forwardly and rearwardly disposed, annular, front and rear surfaces 30 and 31 and radially inwardly and radially outwardly disposed inside and outside cylindrical surfaces 32 and 33. The inside surface 32 of the ring R is normally substantially equal in diameter with the diameter of flow passages 18 and 18'; while the outside surface 33 is substantially equal in diameter with but no greater than the bore 17 of the socket 11 whereby the ring, when engaged in the socket, establishes sliding frictional engagement with the bore 17.

It is extremely important to note that the ring R cannot be larger in outside diametric extent than the diameter of the bore 17.

If the ring is improperly made larger than the bore, it will contain excessive stock and will, when engaged in the socket and with the bore, bend, yield twist and/or distort in such a way that uniform contact with the bore 17 and with the seat 10 could not be established. Further, in such a case, when the distorted ring is engaged by the sealing face 12 of the male section M and is compressed axially between the seat and the face, there will be a strong likelihood or possibility that the material of the ring will not flow to establish a uniform uninterrupted fluid tight seal with the seat 10 and the face 12, but will flow to establish substantially radially extending creases and/or wrinkles across its end surfaces, which creases and/or wrinkles will cooperate with their related seat and face to define channels through which fluid can readily flow.

The seal structure S, in addition to the ring R, axially disposed ring seat 10, sealing face 12 and the ring embracing bore 17 of the socket includes a plurality of circumferentially spaced longitudinally extending and radially inwardly projecting sealing ring engaging retaining ribs 40 on the forward end portion of the bore 11. The ribs 40 join and project axially forward from the seal seat 10. The retaining ribs 40 are preferably V-shaped in cross-section, being defined by flat radially inwardly converging flanks. The convergent flanks define thin, sharp, central longitudinally extending, radially inwardly disposed edges 41 on the ribs.

The ribs 41 are preferably inclined longitudinally and radially outwardly at an angle of, for example, 5° to impart a desired wedging action on and with the ring when the ring is engaged therewith. Further, inclination of the ribs in the above manner requires that the portion of the mold for the female section establishing the ribs have desirable draft facilitating molding or casting the ribs in the section.

The ring retaining ribs 40 are of predetermined limited cross-sectional extent and are such that they engage in and establish snug frictional engagement in the outer peripheral portions of the ring R which occur adjacent thereto.

The ribs 40 are of a size and are spaced so that when the ring R is moved axially forwardly in the socket and adjacent the seat 10, they wedge and slide into engagement therewith to displace the rubber of the ring adjacent thereto substantially axially rearwardly and outwardly. The rubber of the ring R is displaced by the ribs in such a manner that the ring substantially conforms to the exterior of the ribs.

It is important to note that the cumulative volumetric extent of the several ribs is sufficiently small so that the ring R is not urged radially inwardly by the ring to such an extent as to cause the ring to distort excessively and prevent its proper engagement with the seat 10 or to substantially assume its proper disposition within the construction, when initially engaged therein.

After the ring is initially engaged in the female section as noted above, the male section M is engaged in the female section with its sealing face 12 in substantially flat engagement with the surface 31 of the ring and is thereafter urged forwardly in the section F to tightly clamp the ring with and between the face and the seat and to cause the ring to flow radially therebetween. As the ring is clamped and caused to flow radially in the above manner, the outer peripheral portion of the ring flows radially outwardly and is urged into tight intimate contact with the ribs 40, in such a manner as to establish increased holding frictional engagement therewith and with the bore 17 of the socket 11. The ring R is normally maintained clamped and in tight engagement with the bore 17 and the ribs 40 and shortly, or in time, cold flows and/or assumes a set with the ribs, seat and bore.

When the ring is engaged and set in the socket and with the ribs, seat and bore, as noted above, it is held sufficiently secure thereby so that it will not slide, slip or otherwise move out of its set position within the female section when the male section is disengaged and moved from within the female section and out of engagement with the ring. Further, the seal, when set in the above manner, is such that it cannot readily be washed or blown out of position in the female section when the coupling is broken and fluid flows rearwardly out through the female section.

The above noted increased and superior gripping and holding of the ring, by the ribs within the socket of the female section, is attributable to a plurality of related factors, including; the increased surface area afforded by the ribs; the engagement of ribs within the mass of the ring R; the increased compressive forces between the ring and the ribs resulting from the displacement of the mass of the ring about the ribs; and the like.

The cumulative volumetric extent of the ribs 40 is such that if the bore 17 of the socket 11 was reduced uniformly in diameter an extent whereby the volume of the socket 11 occupied by the ring was reduced an amount equal to the volume of the ribs, the ring R could not be engaged in the socket without the likelihood or probability of collapsing and so distorting the ring it could not establish a proper and effective seal.

In the preferred carrying out of the invention and as clearly shown in the drawings, the seal structure S includes annular holding and sealing beads 50 and 51 on the seat 10 and face 12 to engage in the surfaces 30 and 31 of the ring R. The beads retain the ring against free radial shifting and displacement between the seat and the face and relative to the bore 17 and the ribs 40.

In addition to the above noted principle function of the beads 50 and 51, the beads also serve the secondary function of enhancing the sealing action of the ring R. The annular beads 50 and 51 are preferably V-shaped in cross-section and project axially outward from their related seat 10 and face 12 to engage and move into the mass of the ring R as the male section M is moved axially fowardly in the female section to clampingly engage and cause the mass of the rubber ring to flow.

Without the beads 50 and 51, the ribs 40 tend to and might cause the mass of the ring R to flow radially inwardly (as it is clamped axially) in such a manner that the mass of the ring might move away from the ribs 40 to an extent that desired engagement between the ribs and the ring could not be established.

With the beads 50 and 51, the beads engage and hold the ring against radial movement and displacement during axial forward movement of the male section relative to the seat in the female section and clamping of the ring therebetween.

The provision of the beads 50 and 51, functioning as noted above, enables the ribs 40 to be sufficiently large to assure their effective engaging and holding of the ring R.

In addition to the above, it has been found that when the ring is rather soft or flexible, the ring readily flows into proper position in the socket and with the ribs 40. When and as the ring R is made stiffer and harder and as its capacity to flow under pressure is reduced, the tendency for the ring to be urged radially inwardly by the ribs 40, when it is first positioned in the socket, increases. Accordingly as the ring becomes stiffer, the requirement or need formeans, such as the beads 50 and 51, to hold the ring radially out during its initial clamping within the construction, is greatly increased.

In the preferred carrying out of the invention, and as shown in the drawings, the rings 50 and 51 are of different diametric extent so that they are not axially aligned and such that they might tend to cooperate to exert undesirable pinching forces into and through the ring. Rather, they are radially offset and such that they cause the mass of the ring between the seat and the face to flow radially in a substantially serpentine manner between them.

In practice, the number of beads 50 and 51 can be varied. The number of beads is determined by the radial extent of the faces 12 and seat 10 and by the size of beads. In the case illustrated, the seat 10 has two beads 50 spaced at substantially equal distances from each other and from the inner and outer perimeters of the seat, while the face 12 has a single bead 51, the radial extent and positioning of which locates it approximately midway between the beads 50.

In practice, when the sealing ring is initially engaged in the socket 11 of the female section F, it only engages the outer or rear portion of the ribs 40 and stops against the bead 50. When the male section M is initially engaged in the female section, the bead 52 first engages the ring R. Therefore, as the male section is advanced forwardly in the female section, beads 50 and 51 initially yieldingly enter and displace the rubber mass of the ring R sufficiently to prevent excess uncontrolled radial inward displacement of the ring and thereafter urges the ring fowardly into full seated engagement with the seat 10, beads 50 and 51, ribs 40 and the bore 17.

Final forward inward movement of the male member causes full tight seated and sealing engagement of the ring R with the seat 10 and the face 12; full seated and retained engagement of the ring R with the beads 50 and 51 and full tight secure sealed engagement of the ring R with the ribs 40 and with the bore 17.

In practice, and as illustrated in FIGS. 6 and 7 of the drawings, the edges 41' of the ribs 40 are serrated or otherwise roughened, upset or deformed to establish teeth, barbs or irregularities with which the rubber mass of the ring R' conforms to establish a mechanical lock between the ribs and the ring.

In the case illustrated, the edges 41' of the ribs 40' are shown as having three longitudinally spaced radially inwardly and axially fowardly projecting barbs 60 which bite into the ring R' to lock therewith and prevent axial rearward movement and/or displacement of the ring.

The barbs 60 are established in the ribs 40' by means of a suitable tool (not shown) which tool is entered into the socket 11 of the section F to engage the ribs and which is thereafter twisted and withdrawn from engagement within the section F'.

In practice, the edges 41' of the ribs 40' need not be provided with substantially uniform and well-defined barbs, such as shown in the drawings. It is quite effective and adequate if the edges 41' of the ribs are simply upset and mutilated to a notable extent and such that somewhere, throughout their longitudinal extent, the material of the ribs is disposed to define at least one edge, shoulder or point which will catch on and/or bite into the ring R' when the coupling is made up.

For example, by employing a cylindrical tool with a sharp forward outer edge, the diameter of which is slightly greater than the inside diametric extent of the ribs 41' and by driving such a tool forwardly into engagement with the ribs, the edges of the ribs are formed with radially inwardly and forwardly turned projections (like unreleased metal cuttings) which effectively catch and hold or lock the ring in place.

In such a case, a single quick and easy to perform manual thrust of the tool into the female section is all that is required.

Another effective tool to effect deforming of the edges of the ribs in a suitable manner to effect mechanical locking of the ribs and ring is a simple externally threaded pipe or tube section which can be thrust into the socket of the female section to engage and scuff the edges of the ribs, twisted and pulled it from engagement therewith to suitably upset and distort the scuffed material at the edges of the ribs.

In practice, the rearmost edges of at least one of the beads 50 on the seat 10 can be upset and deformed in the same or similar manner that the ribs 40 are upset and/or deformed, to establish ring engaging barbs 61 or the like on the worked upon bead. The barb 61 on the ring engaging bead or beads 50 serve to engage and lock the seated and set ring in substantially fixed position within the construction.

It is to be noted that since the ring R remains in set fixed position in the female section F, the mutilation of the surface 30 of the ring caused by the barbs or projections 61 does not, in the absence of some extraordinary circumstances, adversely affect the effectiveness of the seal structure.

Having described only typical preferred forms and/or applications of the invention, we do not wish to be limited to the specific details herein set forth but wish to reserve to ourselves any modifications and/or variations that may appear to those skilled in the art and which fall within the scope of the following claims:

Having described my invention, I claim:

1. A fluid coupling including an elongate female section with front and rear ends, a central longitudinal flow passage, a socket with a cylindrical bore and a flat radial rearwardly disposed annular seat entering the rear end concentric with the bore; an annular resilient sealing ring with flat radially extending front and rear surfaces; a substantially cylindrical inner side and a cylindrical outer side; said ring is positioned in the socket with its front surface in flat engagement on said seat and its outer side engaging said bore; an elongate male section with front and rear ends, a central longitudinal flow passage, a cylindrical front end portion slidably engaged in the socket and a flat radially extending, forwardly disposed annular sealing face at the forward end of said cylindrical portion and establishing flat engagement with the rear surface of the ring; and mechanical means engaged with and between the sections, and urging and holding the male section forwardly relative to the female section with said ring clamped tight between the seat and the face; and retaining means to retain the ring in the socket and including a plurality of circumferentially spaced longitudinally extending, radially inwardly projecting ribs on said bore and about which adjacent portions of the ring flow and establish tight contact.

2. The structure set forth in claim 1 wherein the ribs have radially inwardly disposed longitudinal edges with irregularities with which the adjacent portions of the ring conform to establish locking engagement between the ring and the ribs.

3. The structure set forth in claim 1 wherein the seat and face have annular axially projecting beads yieldingly entering adjacent portions of the ring and holding the ring against radial inward shifting and displacement between the seat and the face and from engagement with the bore and the ribs.

4. The structure set forth in claim 2 wherein the seat and face have annular axially projecting beads yieldingly entering adjacent portions of the ring and holding the ring against radial inward shifting and displacement between the seat and the face and from engagement with the bore and the ribs.

5. The structure set forth in claim 3 wherein the annular beads on the face are radially offset from the annular beads on the seat.

6. The structure as set forth in claim 3 wherein the seat has a plurality of annular beads, one of said beads is formed with irregularities about and with which adjacent portions of the ring flow and conform to lock the ring with that rib and in that socket.

* * * * *